United States Patent
Hamaguchi et al.

(10) Patent No.: US 10,391,678 B2
(45) Date of Patent: Aug. 27, 2019

(54) METHOD FOR MODIFYING SURFACE OF COMPOSITE MATERIAL, METHOD FOR BONDING COMPOSITE MATERIAL, COMPOSITE MATERIAL, AND BONDED STRUCTURE

(71) Applicant: Nissan Motor Co., Ltd., Yokohama-shi, Kanagawa (JP)

(72) Inventors: Yuji Hamaguchi, Kanagawa (JP); Takafumi Fukumoto, Kanagawa (JP); Katsumi Morohoshi, Kanagawa (JP); Katsuhiro Usui, Kanagawa (JP); Ayako Takano, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 57 days.

(21) Appl. No.: 15/539,004

(22) PCT Filed: Dec. 26, 2014

(86) PCT No.: PCT/JP2014/084677
§ 371 (c)(1),
(2) Date: Jun. 22, 2017

(87) PCT Pub. No.: WO2016/103508
PCT Pub. Date: Jun. 30, 2016

(65) Prior Publication Data
US 2017/0348875 A1 Dec. 7, 2017

(51) Int. Cl.
*B29B 13/08* (2006.01)
*B29C 59/16* (2006.01)
(Continued)

(52) U.S. Cl.
CPC .............. *B29B 13/08* (2013.01); *B29C 59/16* (2013.01); *B29C 65/483* (2013.01);
(Continued)

(58) Field of Classification Search
CPC ....... B29B 13/08; B29C 59/16; B29C 65/483; B29C 65/4835; B29C 65/4845;
(Continued)

(56) References Cited

U.S. PATENT DOCUMENTS 9,610,713 B2   4/2017  Mochizuki
2009/0226702 A1*  9/2009  Madsen .............. B29C 65/5028
                                                        428/317.1
(Continued)

FOREIGN PATENT DOCUMENTS

CN    101579924 A    11/2009
CN    103561937 A    2/2014
(Continued)

OTHER PUBLICATIONS

Machine Translation of JP-61068229-A (Year: 1986).*

*Primary Examiner* — Daniel McNally
(74) *Attorney, Agent, or Firm* — Global IP Counselors, LLP

(57) ABSTRACT

A composite material is formed by irradiating a bonding position on a surface of the composite material with a laser to cause a reinforcing base member of the composite material, that is impregnated with a resin and onto which a bonding agent is applied, to be exposed and fluffed.

16 Claims, 9 Drawing Sheets

(51) Int. Cl.
*B29C 65/48* (2006.01)
*B32B 5/24* (2006.01)
*B29C 65/00* (2006.01)
*B32B 5/28* (2006.01)
*B29C 65/52* (2006.01)
*B29C 65/82* (2006.01)

(52) U.S. Cl.
CPC ........ *B29C 65/488* (2013.01); *B29C 65/4835* (2013.01); *B29C 65/4845* (2013.01); *B29C 66/0246* (2013.01); *B29C 66/1122* (2013.01); *B29C 66/21* (2013.01); *B29C 66/3034* (2013.01); *B29C 66/30325* (2013.01); *B29C 66/41* (2013.01); *B29C 66/721* (2013.01); *B32B 5/24* (2013.01); *B29C 65/524* (2013.01); *B29C 65/8207* (2013.01); *B29C 66/7212* (2013.01); *B29C 66/7394* (2013.01); *B32B 5/28* (2013.01)

(58) Field of Classification Search
CPC .............. B29C 65/488; B29C 66/0246; B29C 66/1122; B29C 66/21; B29C 66/30325; B29C 66/3034; B29C 66/41; B29C 66/721; B32B 5/24
See application file for complete search history.

(56) References Cited

U.S. PATENT DOCUMENTS

| | | | | |
|---|---|---|---|---|
| 2013/0288036 | A1* | 10/2013 | Schulze | B29C 65/5057 |
| | | | | 428/223 |
| 2014/0119813 | A1 | 5/2014 | Moselage, III | |
| 2015/0367538 | A1* | 12/2015 | Mochizuki | B29C 65/08 |
| | | | | 428/167 |

FOREIGN PATENT DOCUMENTS

| | | | | |
|---|---|---|---|---|
| DE | 10 2008 063651 A1 | 7/2010 | | |
| JP | 61-42544 A | 3/1986 | | |
| JP | 61068229 A * | 4/1986 | ......... | B29C 37/0082 |
| JP | 11-90986 A | 4/1999 | | |
| JP | 2010-234524 A | 10/2010 | | |
| JP | 2011-79289 A | 4/2011 | | |
| JP | 2013-166904 A | 8/2013 | | |
| JP | 2014-172201 A | 9/2014 | | |
| JP | 5632567 B1 | 11/2014 | | |
| WO | 2014/125999 A1 | 8/2014 | | |
| WO | WO-2014125999 A1 * | 8/2014 | ............. | B29C 65/08 |

\* cited by examiner

METHOD FOR MODIFYING SURFACE OF COMPOSITE MATERIAL, METHOD FOR BONDING COMPOSITE MATERIAL, COMPOSITE MATERIAL, AND BONDED STRUCTURE

CROSS-REFERENCE TO RELATED APPLICATIONS

This application is a U.S. National stage application of International Application No. PCT/JP2014/084677, filed Dec. 26, 2014.

BACKGROUND

Field of the Invention

The present invention relates to a method for modifying the surface of a composite material; a method for bonding a composite material; a composite material; and a bonded structure.

Background Information

In recent years, composite materials made by impregnating a reinforcing base material with resin have been used as automobile parts to reduce the body weight of automobiles. Automobile parts are formed by joining composite materials to each other via a bonding agent, but in general, since bonding between composite materials and the bonding agent is low, it is necessary to improve the bonding of the composite material to the bonding agent.

In relation to the foregoing, for example, Japanese Laid Open Patent Application No. 2013-166904 (Patent Document 1) below discloses a bonding method that uses a bonding agent in which is mixed a granular/fibrous dielectric heating medium that has dielectric heating properties, and that is capable of biting into a composite material by pressurization.

According to this method, a bonding agent, in which the dielectric heating medium is mixed, is disposed between a pair of composite materials and pressed while being melted by induction heating; the dielectric heating medium thereby bites into the composite materials, and thus, it becomes possible to realize a favorable bonding between the composite materials and the bonding agent.

SUMMARY

However, in the bonding method disclosed in Patent Document 1, since not only the bonding agent, but also the composite materials, are heated by dielectric heating, there is the possibility that the composite materials may be deformed.

In order to achieve the above-described object, the present invention provides a method for modifying the surface of a composite material, whereby it becomes possible to improve the bonding of the composite material to a bonding agent, while preventing the composite material from being deformed, and a method for bonding a composite material using the same.

Another object of the present invention is to provide a composite material with improved bonding to a bonding agent, while suppressing deformation, and a bonded structure comprising the same.

The method for modifying the surface of a composite material according to the present invention, which achieves the object described above, is a method in which a bonding position on the surface of a composite material, comprising a reinforcing base material impregnated with a resin and onto which a bonding agent is to be applied, is irradiated with a laser to cause the reinforcing base material to be exposed and fluffed.

In addition, the method for bonding a composite material according to the present invention, which achieves the object described above, is a method in which the bonding agent is applied to the reinforcing base material that has been fluffed by the method for modifying the surface of a composite material described above. Then, a separate member is disposed on the composite material on the opposite side of the bonding agent, and the separate member is bonded to the composite material.

In addition, the composite material, which achieves the object described above, is made by irradiating with a laser a bonding position on the surface of a composite material comprising a reinforcing base member impregnated with a resin and onto which a bonding agent is to be applied, to cause the reinforcing base member to be exposed and fluffed.

Additionally, the bonded structure, which achieves the object described above, is made by applying the bonding agent to the fluffed reinforcing base material of the composite material described above; disposing a separate member on the composite material on the opposite side of the bonding agent; and bonding the separate member to the composite material.

According to the method for modifying the surface of a composite material and the method for bonding a composite material configured as described above, a bonding agent is applied to the fluffed reinforcing base material of the composite material; therefore, it is possible to improve the bonding of the composite material to the bonding agent, due to the anchor effect and the increase in the bonding area. Additionally, since the bonding is improved by irradiating a laser on the surface of the composite material, it is possible to improve the bonding while preventing the composite material from being deformed. Therefore, it is possible to improve the bonding of the composite material to a bonding agent while preventing the composite material froth being deformed, and to provide a method for bonding a composite material using the same.

Furthermore, according to the composite material and the bonded structure configured as described above, since a bonding agent is applied to a fluffed reinforcing base material, it is possible to improve the bonding of the composite material to the bonding agent, due to the anchor effect and the increase in the bonding area. Additionally, since the bonding is improved by irradiating a laser on the surface of the composite material, it is possible to improve the bonding while preventing the composite material from being deformed. Therefore, it is possible to provide a composite material with improved bonding to a bonding agent while suppressing deformation, and a bonded structure comprising the same.

DETAILED DESCRIPTION OF THE EMBODIMENTS

Embodiments of the present invention will be explained below, with reference to the appended drawings. In the explanations of the drawings, the same elements are given the same codes, and overlapping explanations are omitted. Dimensional ratios of the drawings are exaggerated for convenience of explanation and may be different from the actual ratio.

Figure 1:
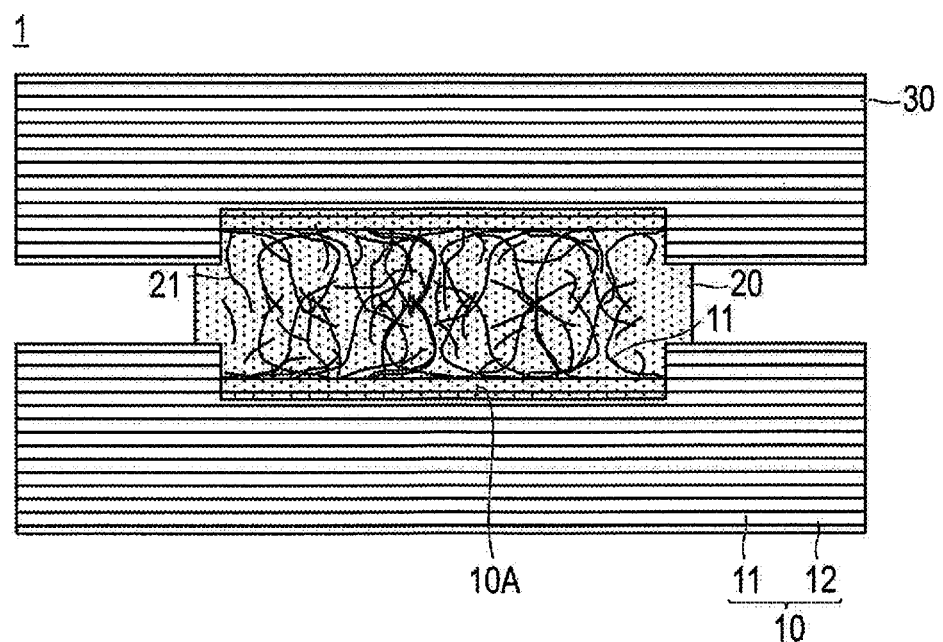
FIG. 1 is a schematic view illustrating a bonded structure according to an embodiment of the present invention.
Figure 2:
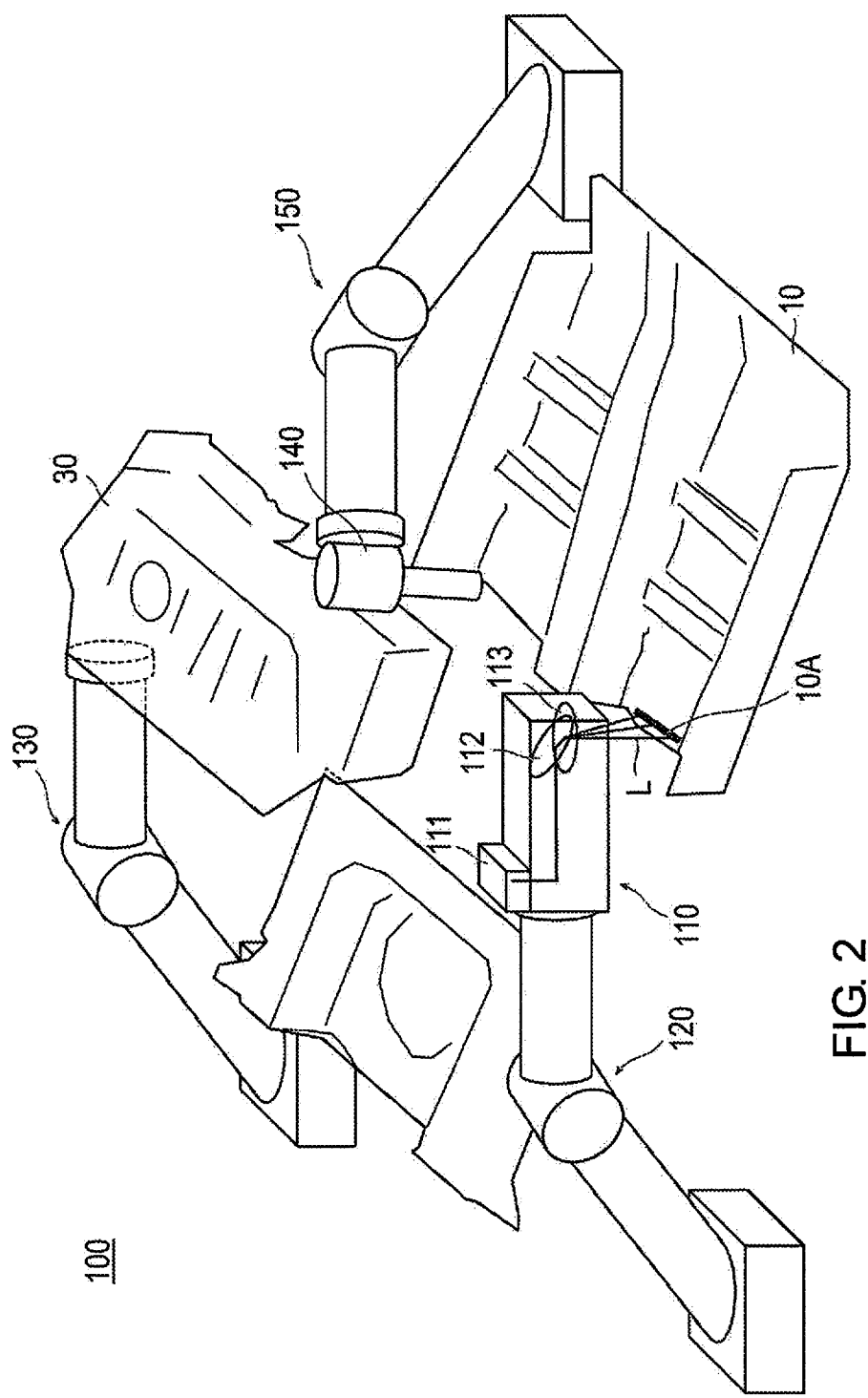
FIG. 2 is a perspective view illustrating the method for modifying a surface of a composite material according to the present embodiment.
Figure 3:
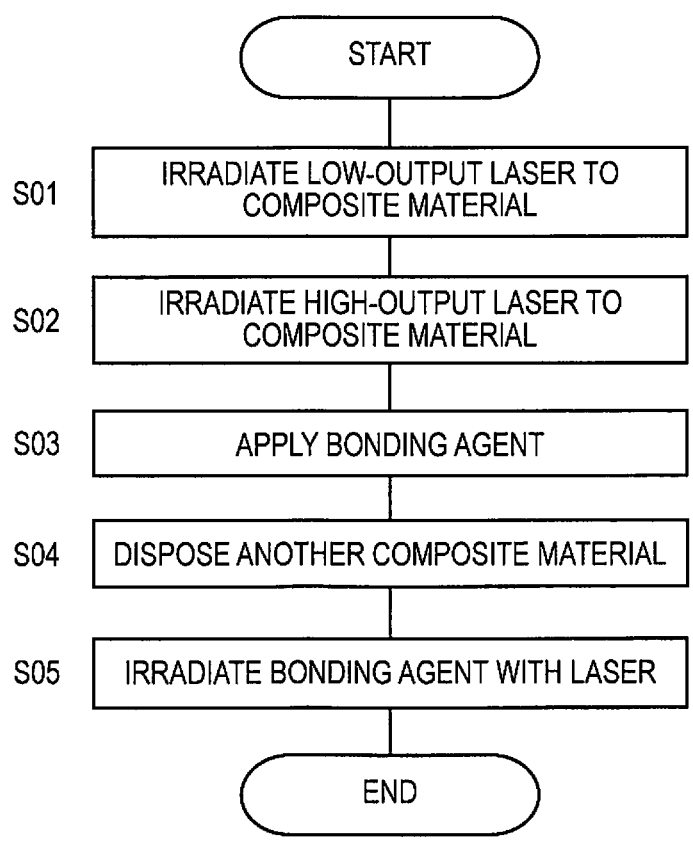
FIG. 3 is a flowchart illustrating the method for bonding the composite material according to the present embodiment.
Figure 4:
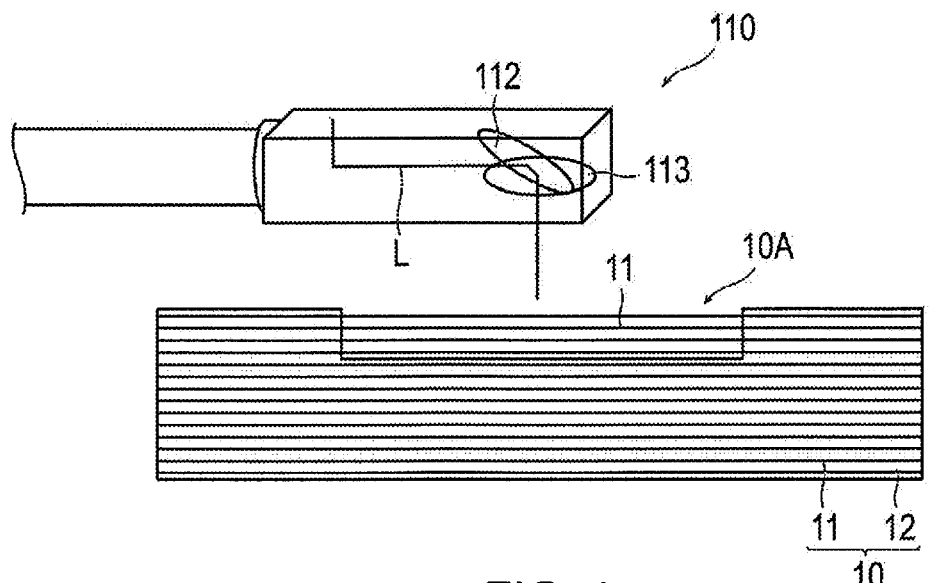
FIG. 4 is a schematic view illustrating a state in which a reinforcing base material is exposed.
Figure 5:
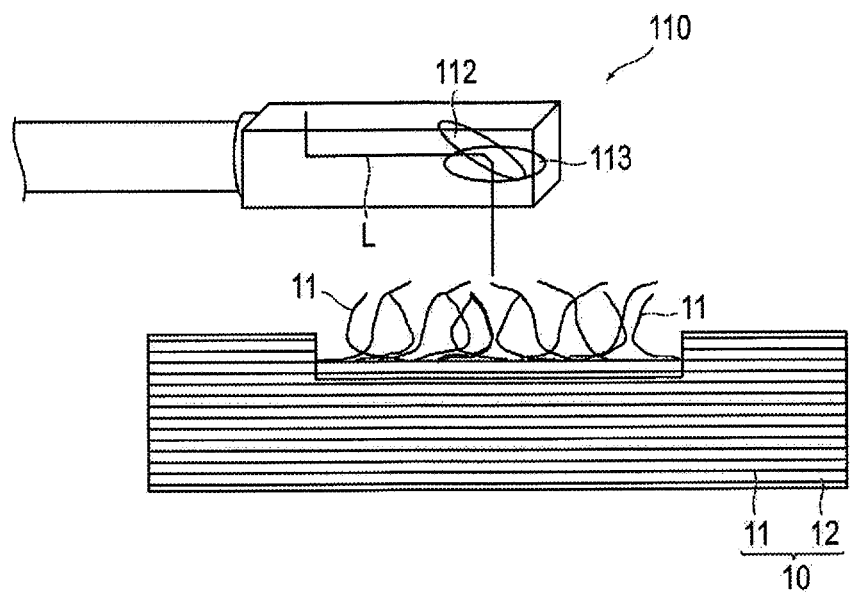
FIG. 5 is a schematic view illustrating a state in which the reinforcing base material is fluffed.
Figure 6:
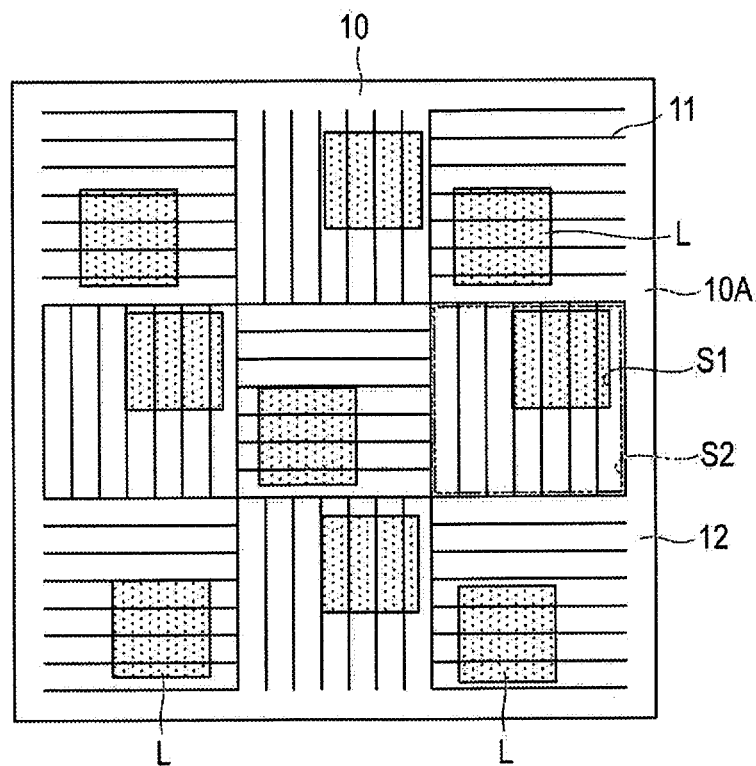
FIG. 6 is a schematic view illustrating a state in which a laser is irradiated on the surface of the composite material.
Figure 7:
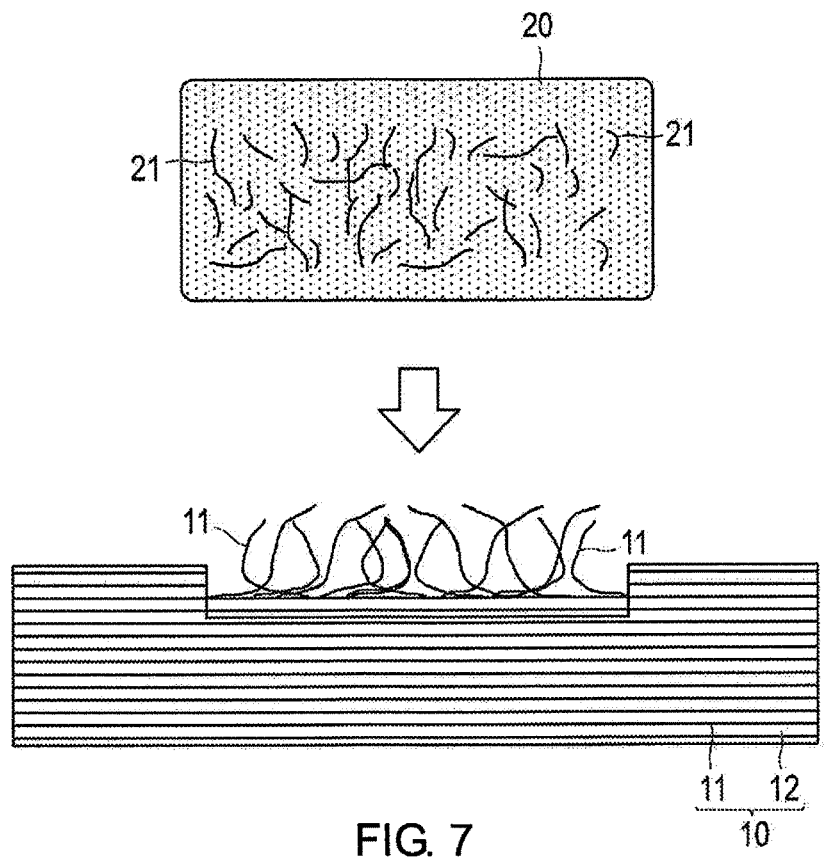
FIG. 7 is a schematic view illustrating a state in which a bonding agent containing fibers is applied to the fluffed reinforcing base material.
Figure 8:
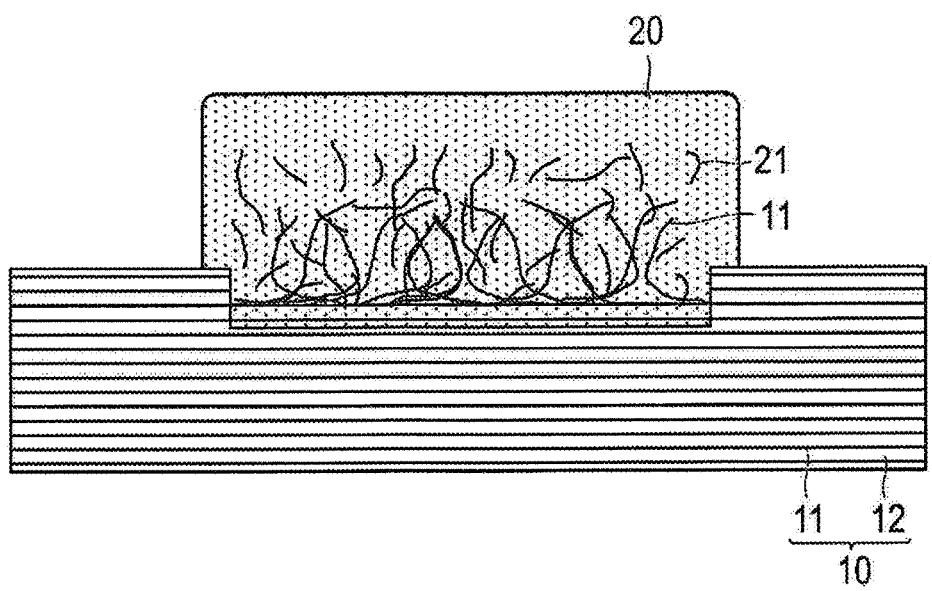
FIG. 8 is a schematic view illustrating a state in which the fiber contained in the bonding agent is entangled with the fluffed reinforcing base material.
Figure 9:
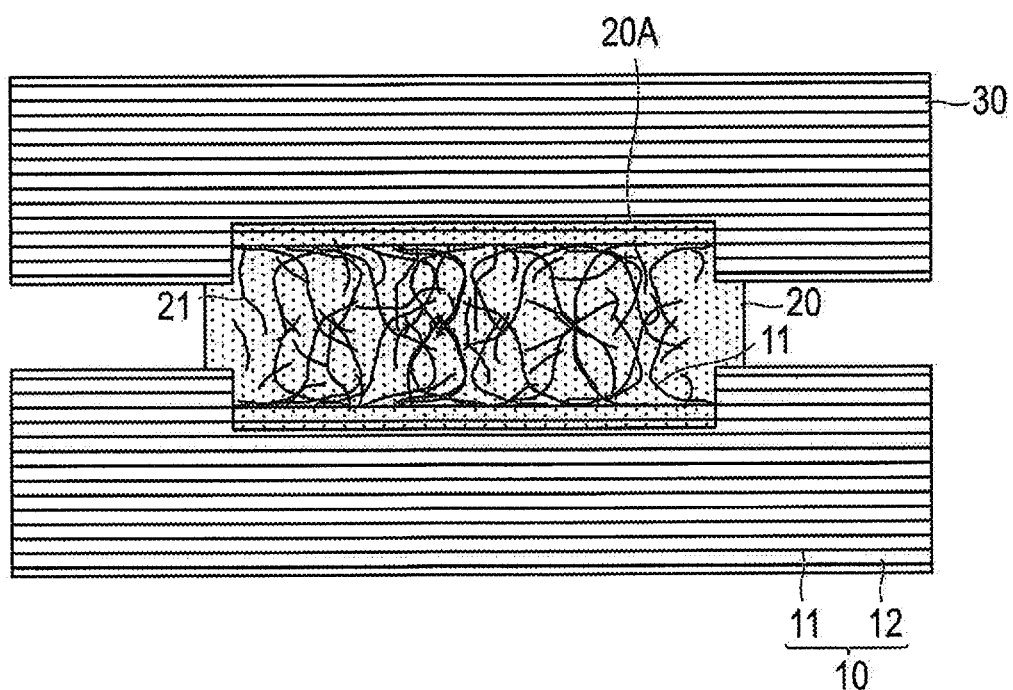
FIG. 9 is a schematic view illustrating a state in which another composite material is disposed on the upper surface of the bonding agent.
Figure 10:
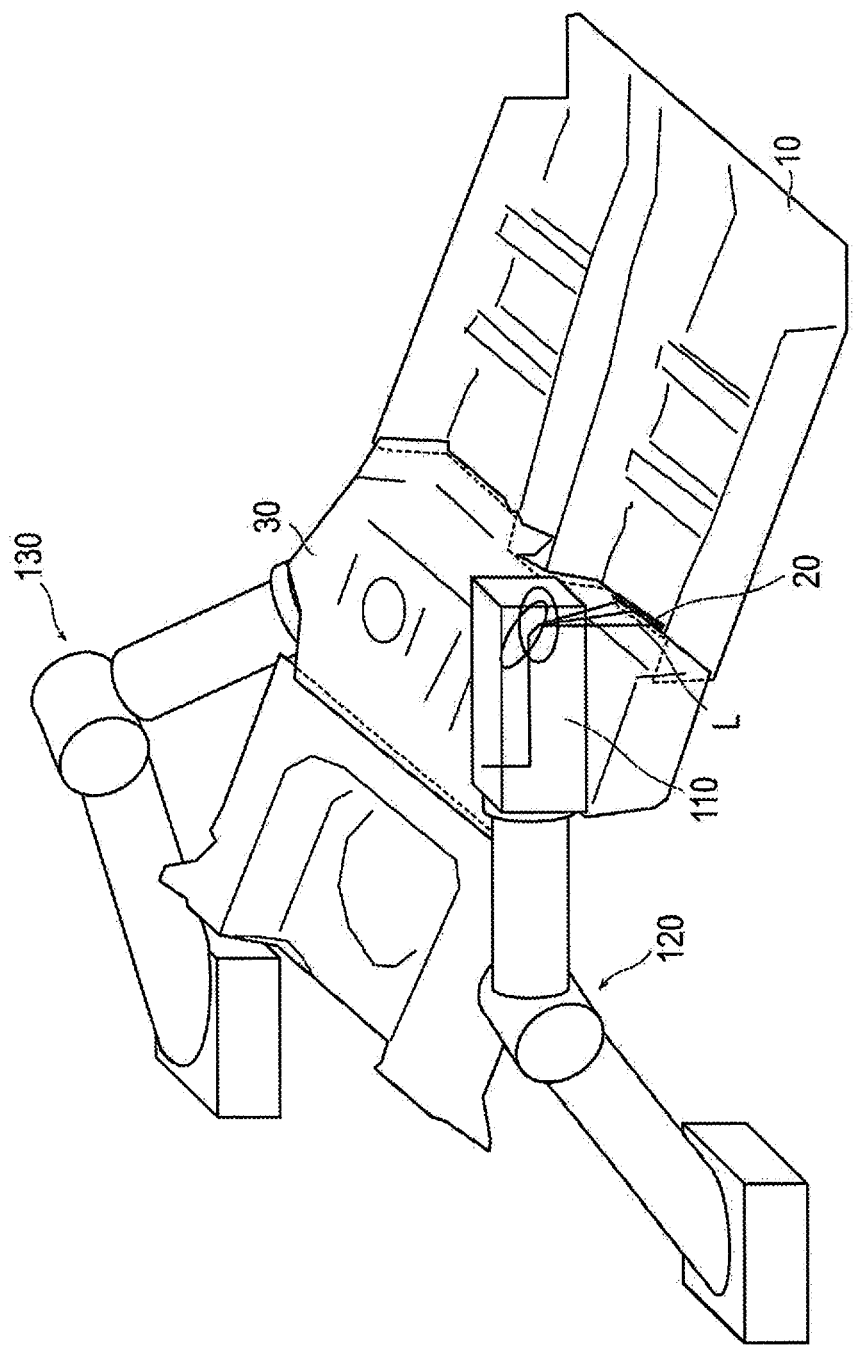
FIG. 10 is a perspective view illustrating a state in which a laser in irradiated onto the bonding agent.

FIG. 1 is a schematic view illustrating the bonded structure 1 according to an embodiment of the present invention. FIG. 2 is a view illustrating the method for modifying the surface of a composite material 10 according to the present embodiment. FIG. 3 is a flowchart illustrating the method for bonding a composite material 10 according to the present embodiment. FIG. 4 is a schematic view illustrating a state in which a reinforcing base material 11 is exposed. FIG. 5 is a schematic view illustrating a state in which the reinforcing base material 11 is fluffed. FIG. 6 is a schematic view illustrating a state in which laser L is irradiated on a surface 10A of the composite material 10. FIG. 7 is a view illustrating a state in which a bonding agent 20 containing fibers 21 is applied to the fluffed reinforcing base material 11. FIG. 8 is a view illustrating a state in which the fiber 21 contained in the bonding agent 20 is entangled with the fluffed reinforcing base material 11. FIG. 9 is a schematic view illustrating a state in which another composite material 30 (separate member) is disposed on the upper surface 20A of the bonding agent 20. FIG. 10 is a schematic view illustrating a state in which laser L is irradiated onto the bonding agent 20.

First, the configuration of the bonded structure 1 according to the present embodiment will be described, with reference to FIG. 1.

The bonded structure 1 is formed by the composite material 10 and the composite material 30 being bonded via the bonding agent 20.

In general, the composite material 10 is made by impregnating the reinforcing base material 11 with a resin 12. The composite material is made by irradiating a bonding position on the surface 10A of the composite material 10 onto which the bonding agent 20 is to be applied with the laser L to cause the reinforcing base member 11 to be exposed and the reinforcing base material 11 to be fluffed.

The composite material 10 comprises a higher strength and rigidity compared to the resin 12 alone, by combining the reinforcing base material 11 and the resin 12.

The reinforcing base material 11 is formed from a textile sheet, such as carbon fiber, glass fiber, and organic fiber.

A thermosetting resin such as epoxy resin, phenol resin, or the like, is used as the resin 12. The mainstream epoxy resin is of a two-liquid type, which is used by mixing a main agent and a curing agent. Generally, a bisphenol A type epoxy resin is used for the main agent and an amine type is used for the curing agent, but no limitation is imposed thereby, and the agents may be appropriately selected according to the desired material properties.

The bonding agent 20 is a thermosetting resin; for example, an epoxy resin based bonding agent, a phenol resin based bonding agent, or the like, may be appropriately used.

Next, the configuration of the bonding device 100 for the composite material 10 will be described, with reference to FIG. 2. In FIG. 2, the laser L, a scanner mirror 112, and a lens 113, are illustrated by solid lines, for ease of understanding. Here, the case in which a composite material 30 as a rear seat is bonded to a composite material 10 as the front seat will be described as an example.

The bonding device 100 for the composite material 10 comprises a laser head 110, a first hand robot 120, a second hand robot 130, a bonding agent application gun 140, and a third hand robot 150.

The laser head 110 comprises an irradiation unit 111 from which laser L is emitted, a scanner mirror 112 for scanning the laser L, and a lens 113 for condensing the laser L. The scanner mirror 112 is controlled by a control unit, which is not shown, such that the laser L is irradiated on a position on the surface 10A of the composite material 10 onto which the bonding agent 20 is to be applied. The details of the irradiation position of the laser L will be described later. The laser L is, for example, a $CO_2$ laser, but no limitation is imposed thereby. In addition, from the point of view of that it is easy to make high-output, the laser L is preferably a pulse wave.

The first hand robot 120 grips the laser head 110. The first hand robot 120 moves the laser head 110 to a predetermined position on the composite material 10, by being controlled by a control unit, which is not shown.

The second hand robot 130 grips the composite material 30. After the reinforcing base material 11 of the composite material 10 is fluffed, the second hand robot 130 moves the composite material 30 to the vicinity of the composite material 10 (refer to FIG. 10), by being controlled by a control unit, which is not shown.

The bonding agent application gun 140 applies the bonding agent 20 to the composite material 10, in which the surface 10A has been modified and the reinforcing base material 11 has been fluffed.

The third hand robot 150 grips the bonding agent application gun 140. The third hand robot 150 moves the bonding agent application gun 140 to a predetermined position on the composite material 10, by being controlled by a control unit, which is not shown.

Next, the method for bonding a composite material 10 according to the present embodiment will be described, with reference to the flowchart of FIG. 3.

First, a low-output laser L is irradiated on the surface 10A of the composite material 10, as illustrated in FIG. 4 (S01). The laser output at this time is, for example, 1.8 mJ. By irradiating a low-output laser L onto the surface 10A of the composite material 10, the resin 12 and the mold releasing agent on the surface 10A are evaporated and removed, to expose the reinforcing base material 11 that is contained in the composite material 10.

Next, the output of the laser L is increased, and the laser L is irradiated toward the reinforcing base material 11, as illustrated in FIG. 5 (S02). The laser output at this time is, for example, 6 mJ. By irradiating the laser L toward the exposed reinforcing base material 11, the reinforcing base material 11 is partially cut into a fluffed state, as illustrated in FIG. 5. As described above, in a step in which the laser output is increased to fluff the reinforcing base material 11 after a low-output laser L is irradiated to expose the reinforcing base material 11, it is possible to fluff the reinforcing base material 11 evenly in the depth direction after removing in advance the resin 12, which has irregularities in the surface. Therefore, since it is possible to uniformly fluff the reinforcing base material 11 in the planar direction, it is possible to have a uniform bonding force in the planar direction between the composite material 10 and the bonding agent 20.

Next, the irradiation position of the laser L with respect to the surface 10A of the composite material 10 will be described, with reference to FIG. 6. FIG. 6 is a view seen from the irradiation direction of the laser L.

The reinforcing base material 11 is, for example, configured from eight fiber bundles, and is configured to have a weave pattern in which the eight fiber bundles are alternately crisscrossed, as illustrated in FIG. 6. The irradiation area S1 of the laser L is smaller than the area S2 of one weave. According to this irradiation method, by locally irradiating the laser L compared to irradiating area S1 of the laser L that is larger than the area S2 of one weave, it is possible to more favorably fluff the reinforcing base material 11.

In addition, the laser L is irradiated so as to be dotted on the surface 10A of the composite material 10, in accordance with the pattern of the weave. According to this irradiation method, since the bonding strength can be changed according to the number of dots, management of the bonding strength becomes easy.

Next, the bonding agent 20 containing fibers 21 is applied to the fluffed reinforcing base material 11, as illustrated in FIG. 7 (S03). The bonding agent 20 is applied by the bonding agent application gun 140. In this manner, by applying the bonding agent 20 containing fibers 21 to the fluffed reinforcing base material 11, the fibers 21 are entangled with the reinforcing base material 11, as illustrated in FIG. 8. Therefore, the bonding at the interface between the composite material 10 and the bonding agent 20 is improved. In addition, by having fibers 21 inside the bonding agent 20, the strength of the bonding agent 20 itself is improved, which contributes to an improvement in the strength of the entire bonded structure 1.

The fiber 21 is preferably the same material as the reinforcing base material 11. According to this configuration, since the reinforcing base material 11 that has become unnecessary can be cut and used as the fiber 21, productivity is improved.

Next, another composite material 30 is disposed on the upper surface 20A of the applied bonding agent 20, as illustrated in FIG. 9 (S04). The composite material 30 is placed by the second hand robot 130. In the composite material 30, the reinforcing base material is preferably exposed and fluffed on the bonding agent 20 side, in the same manner as the composite material 10. Additionally, the member that is disposed on the upper surface of the bonding agent 20 is not limited to the composite material 30, and may be a metal, or the like.

Next, the bonding agent 20 is irradiated with the laser L, as illustrated in FIG. 10 (S05). Since the bonding agent 20 is a thermosetting agent, the bonding agent is cured by the laser irradiation, and the composite material 10 and the composite material 30 are bonded via the bonding agent 20. At this time, it is preferable to defocus the focal position of the laser L to carry out irradiation, so as not to damage the composite material 10 by the energy of the laser L.

With the steps described above, the composite material 10 and the composite material 30 are bonded via the bonding agent 20, and the bonded structure 1 illustrated in FIG. 1 is manufactured.

Next, the effects of the method for bonding a composite material 10 according to the present embodiment will be described, with reference to FIGS. 11 and 12.

Figure 11:
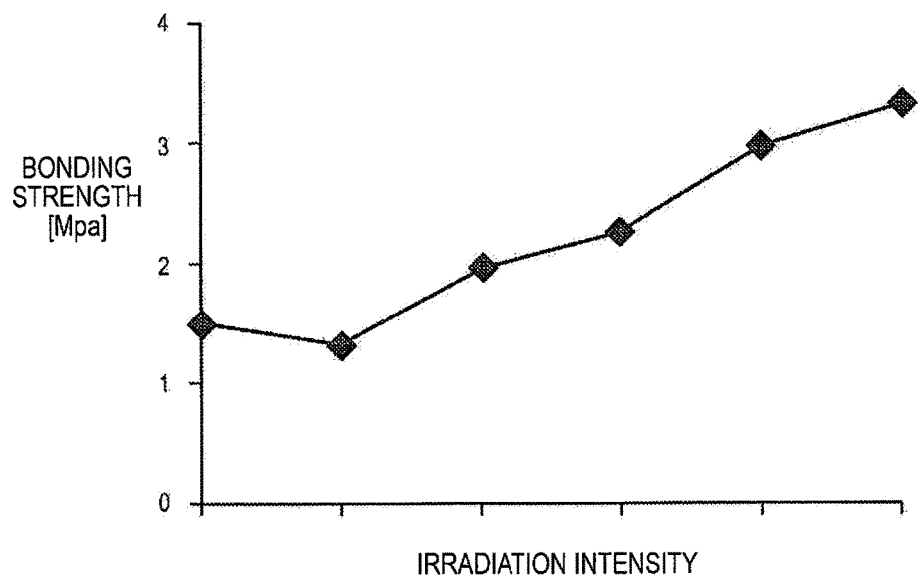
FIG. 11 is a graph illustrating the relationship between the irradiation intensity of the laser and the bonding strength.

FIG. 11 is a graph illustrating the relationship between the irradiation intensity of the laser L and the bonding strength. In FIG. 11, the horizontal axis represents the irradiation intensity of the laser L, and the vertical axis represents the bonding strength between the composite material 10 and the composite material 30. FIG. 11 shows the bonding strength between composite materials 10 and 30, obtained by impregnating glass fiber with polypropylene. The amount of fluffing of the reinforcing base material 11 is increased as the irradiation intensity of the laser L is increased, and as a result, the bonding strength between the composite material 10 and the composite material 30 is increased, as illustrated in FIG. 11.

Figure 12:
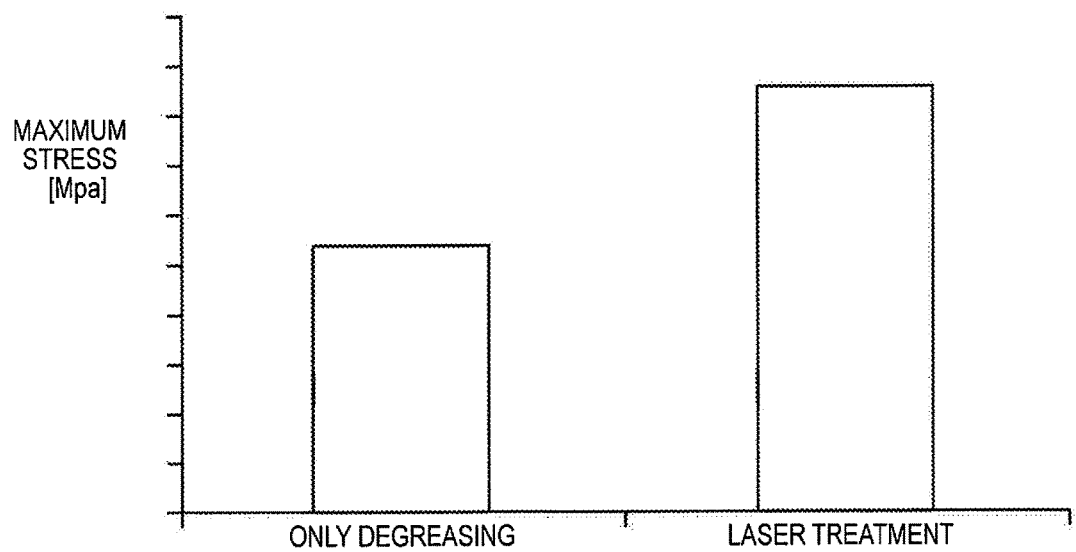
FIG. 12 is a bar graph illustrating the relationship between the presence/absence of laser irradiation and maximum stress.

FIG. 12 is a graph illustrating the relationship between the presence/absence of laser irradiation and maximum stress. In FIG. 12, the left side of the horizontal axis is a result when there is no laser irradiation onto the surface 10A of the composite material 10 and only degreasing is carried out, and the right side of the horizontal axis is the result of when laser is irradiated onto the surface 10A of the composite material 10. Additionally, the vertical axis in FIG. 12 represents the maximum stress between the bonded composite material 10 and bonding agent 20. The maximum stress is improved by irradiating the laser L on the surface 10A of the composite material 10 and fluffing the reinforcing base material 11, as illustrated in FIG. 12.

As described above, in the method for modifying the surface of a composite material 10 according to the present embodiment, a bonding position on the surface 10A of a composite material 10 comprising a reinforcing base material 11 impregnated with a resin 12 and onto which the bonding agent 20 is to be applied is irradiated with laser L. The reinforcing base material 11 is exposed and the reinforcing base material 11 is fluffed by irradiating with the laser L. Therefore, since the bonding agent 20 is applied to a fluffed reinforcing base material 11 of the composite material 10, it is possible to improve the bonding of the composite material 10 to the bonding agent 20, due to the anchor effect and the increase in the bonding area. Additionally, since the bonding is improved by irradiating the laser L on the surface 10A of the composite material 10, it is possible to improve the bonding while preventing the composite material 10 from being deformed. Therefore, it is possible to improve the bonding of the composite material 10 to the bonding agent 20 while preventing the composite material 10 from being deformed.

Additionally, the reinforcing base material 11 is fluffed by exposing the reinforcing base material 11, and then irradiating with the laser L after increasing the output thereof. Therefore, it is possible to fluff the reinforcing base material 11 evenly in the depth direction after removing in advance the resin 12, which has irregularities in the surface. Therefore, since it is possible to uniformly fluff the reinforcing base material 11 in the planar direction, it is possible to have a uniform bonding force in the planar direction between the composite material 10 and the bonding agent 20.

Additionally, the fiber bundles that form the reinforcing base material 11 are configured to have a weave pattern in which the fiber bundles are alternately crisscrossed, and the laser L is irradiated such that the irradiation area S1 of the laser L is smaller than the area S2 of one weave. According to this irradiation method, by locally irradiating the laser L compared to when the irradiation area S1 of the laser L is larger than the area S2 of one weave, it is possible to more favorably fluff the reinforcing base material 11.

Additionally, as described above, in the method for bonding a composite material 10 according to the present embodiment, the bonding agent 20 is applied to the reinforcing base material 11 that has been fluffed by the method for modifying the surface described above, and the composite material 30 is disposed opposite to the composite material 10 with respect to the bonding agent 20. Then, the composite material 30 is bonded to the composite material 10. Therefore, since the bonding agent 20 is applied to a fluffed reinforcing base material 11 of the composite material 10, it is possible to improve the bonding of the composite material 10 to the bonding agent 20, due to the anchor effect and the increase in the bonding area. Additionally, since the bonding is improved by irradiating the laser L on the surface 10A of the composite material 10, it is possible to improve the bonding while preventing the composite material 10 from being deformed. Therefore, it is possible to improve the bonding of the composite material 10 to the bonding agent 20 while preventing the composite material 10 from being deformed.

Additionally, the bonding agent 20 contains the fibers 21 that are entangled with the fluffed reinforcing base material 11. Accordingly, the bonding between the composite material 10 and the bonding agent 20 is further improved.

In addition, the fibers 21 that are entangled with the reinforcing base material 11 are made from the same material as the reinforcing base material 11. Accordingly, the reinforcing base material 11 that has become unnecessary can be cut and used as the fiber 21, reuse becomes possible, and productivity is improved.

Additionally, the bonding agent 20 is a thermosetting agent, which is cured by irradiating the bonding agent 20 with a laser L after disposing the composite material 30. Accordingly, it is possible to use the same laser L as that is used for modifying the surface of the composite material 10 in the step to cure the bonding agent 20, and thus, to omit equipment.

In addition, as described above, the composite material 10 according to the present embodiment is made by irradiating, with the laser L, the bonding position on the surface 10A of the composite material 10 onto which the bonding agent 20 is to be applied, to cause the reinforcing base member 11 to be exposed and the reinforcing base material 11 to be fluffed. Therefore, since the bonding agent 20 is applied to the fluffed reinforcing base material 11, it is possible to improve the bonding to the bonding agent 20, due to the anchor effect and the increase in the bonding area. Additionally, since the bonding is improved by irradiating the laser L on the surface 10A of the composite material 10, it is possible to improve the bonding while preventing the composite material 10 from being deformed. Therefore, it is possible to provide a composite material 10 with improved bonding to the bonding agent 20 while suppressing deformation.

Additionally, the fiber bundles that form the reinforcing base material 11 are configured to have a weave pattern in which the fiber bundles are alternately crisscrossed, and the laser L is irradiated such that the irradiation area S1 of the laser L is smaller than the area S2 of one weave, to obtain the composite material 10. Therefore, by locally irradiating the laser L compared to when the irradiation area S1 of the laser L is larger than the area S2 of one weave, and it is possible to more favorably fluff the reinforcing base material 11.

Additionally, as described above, the bonded structure 1 according to the present embodiment is obtained by applying the bonding agent 20 to the reinforcing base material 11 that has been fluffed, disposing a composite material 30 opposite to the composite material 10 with respect to the bonding agent 20, and bonding the composite material 30 to the composite material 10. Therefore, since the bonding agent 20 is applied to a fluffed reinforcing base material 11 of the composite material 10, it is possible to improve the bonding to the bonding agent 20, due to the anchor effect and the increase in the bonding area. Additionally, since the bonding is improved by irradiating the laser L on the surface 10A of the composite material 10, it is possible to improve the bonding while preventing the composite material 10 from being deformed. Therefore, it is possible to provide the bonded structure 1 comprising a composite material 10 with improved bonding to the bonding agent 20 while suppressing deformation.

Additionally, the bonding agent 20 contains the fibers 21 that are entangled with the reinforcing base material 11. Accordingly, the bonding between the composite material 10 and the bonding agent 20 is further improved.

In addition, the fibers 21 that are entangled with the reinforcing base material 11 are made from the same material as the reinforcing base material 11. Accordingly, the reinforcing base material 11 that has become unnecessary can be cut and used as the fiber 21, reuse becomes possible, and productivity is improved.

Modified examples of the above-described embodiment are illustrated below.

Figure 13:
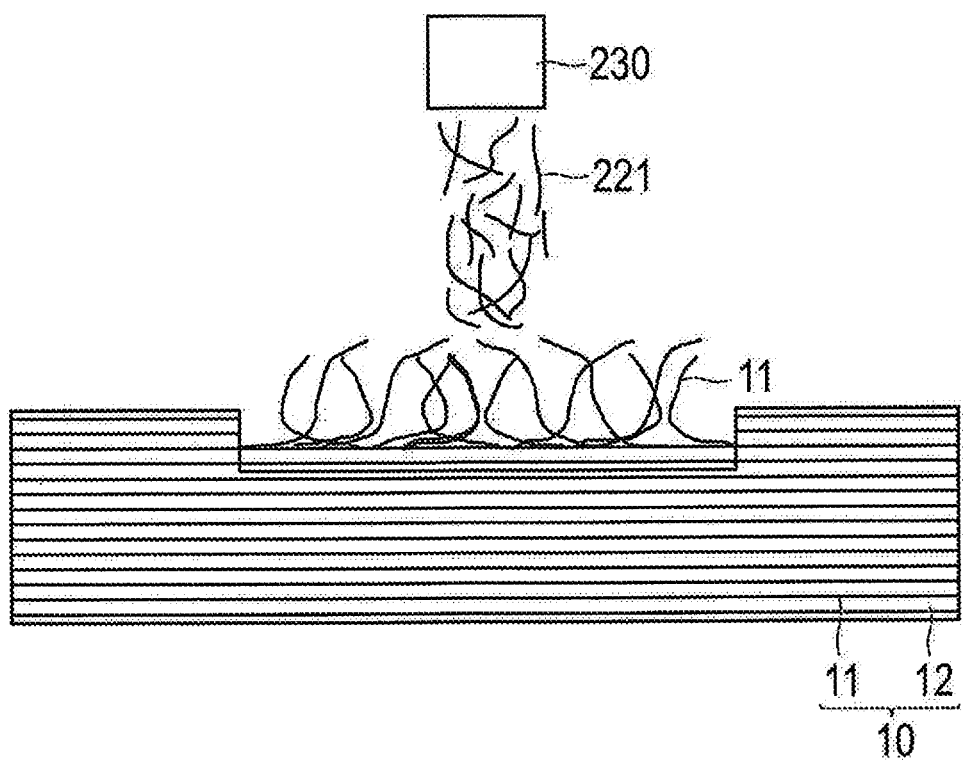
FIG. 13 is a schematic view illustrating the method for bonding a composite material according to a modified example.

In the above-described embodiment, the bonding agent 20 containing the fibers 21 was applied to the composite material 10, the surface of which is modified. However, a bonding agent that does not contain fibers may be applied as well. At this time, it is preferable to apply the fibers 221 with the fiber application device 230, before applying the bonding agent, as illustrated in FIG. 13. By applying the fibers 221 before applying the bonding agent in this manner, the fibers 221 are entangled with the reinforcing base material 11, thereby further improving the bonding between the composite material 10 and the bonding agent.

Additionally, in the above-described embodiment, the reinforcing base material 11 is exposed by irradiating a low-output laser L thereto, after which the reinforcing base material 11 is fluffed by irradiating the laser L after increasing the output thereof. However, the laser L may be irradiated on the surface 10A of the composite material 10 in a state in which the output is increased in advance, to expose and fluff the reinforcing base material 11 at the same time.

Additionally, in the embodiment described above, the resin 12 was thermosetting, but no limitation is imposed thereby, and the resin may be a thermoplastic resin as well.

Furthermore, in the above-described embodiment, the laser L for carrying out surface modification and the laser L for curing the bonding agent 20, were the same laser L. However, different lasers may be used as well. At this time, the laser that is used for curing the bonding agent 20 is preferably a continuous beam laser, from the point of view of easily raising the temperature of parts and being able to raise the temperature of a wide area.

In addition, in the above-described embodiment, a thermosetting bonding agent was used as the bonding agent 20. However, the bonding agent may be a thermoplastic bonding agent. In this case, the composite materials 10 and 30 are bonded to each other by cooling the bonding agent.

The invention claimed is:

1. A composite material modification method comprising:
    irradiating a surface of a composite material with a laser to expose and fluff a reinforcing base member of the composite material to the surface of the composite material, the composite material comprising the reinforcing base member that is impregnated with a resin.

2. The composite material modification method according to claim 1, further comprising
    applying a bonding agent to the reinforcing base material that has been fluffed;
    disposing a separate member on the composite material on an opposite side of the bonding agent; and
    bonding the separate member to the composite material.

3. The composite material modification method according to claim 2, wherein
    the bonding agent contains fibers that are entangled with the reinforcing base material that has been fluffed.

4. The composite material modification method according to claim 3, wherein
    the fibers that are entangled with the reinforcing base material are made from the same material as the reinforcing base material.

5. The composite material modification method according to claim 4, wherein
    the bonding agent is thermosetting; and
    the bonding agent is cured by irradiating with the laser after disposing the separate member.

6. The composite material modification method according to claim 3, wherein
    the bonding agent is thermosetting; and
    the bonding agent is cured by irradiating with the laser after disposing the separate member.

7. The composite material modification method according to claim 2, further comprising
    applying fibers that are entangled with the fluffed reinforcing base material before applying the bonding agent.

8. The composite material modification method according to claim 7, wherein
    the fibers that are entangled with the reinforcing base material are made from the same material as the reinforcing base material.

9. The composite material modification method according to claim 7, wherein
    the bonding agent is thermosetting; and
    the bonding agent is cured by irradiating with the laser after disposing the separate member.

10. The composite material modification method according to claim 2, wherein
    the bonding agent is thermosetting; and
    the bonding agent is cured by irradiating with the laser after disposing the separate member.

11. The composite material modification method according to claim 1, wherein
    the reinforcing base material is fluffed by exposing the reinforcing base material and then irradiating with the laser after increasing the output thereof.

12. The composite material modification method according to claim 1, wherein
    the reinforcing base material is formed of fiber bundles are configured to have a weave pattern in which the fiber bundles are alternately crisscrossed; and
    the laser is irradiated such that an irradiation area of the laser is smaller than an area of one weave of the fiber bundles.

13. A bonded structure comprising:
    a composite material obtained by irradiating a bonding position on a surface of the composite material with a laser to cause a reinforcing base member, that is impregnated with a resin and onto which a bonding agent is applied, to be exposed and fluffed;
    a bonding agent applied to the reinforcing base material of the composite material that has been fluffed; and
    a separate member that is disposed on the composite material opposite to the bonding agent, and the separate member is bonded to the composite material, the reinforcing base member that has been exposed and fluffed extending from a recess of the composite member into a space that separates the surfaces of the composite member and the separate member and into another recess of the separate member.

14. The bonded structure according to claim 13, wherein the bonding agent contains fibers that are entangled with the fiber bundles of the reinforcing base material that has been fluffed.

15. The bonded structure according to claim 14, wherein the fibers that are entangled with the fiber bundles of the reinforcing base material are made from the same material as the fiber bundles of the reinforcing base material.

16. The bonded structure according to claim 13, wherein the reinforcing base material includes a plurality of fiber bundles that have a weave pattern in which the fiber bundles are alternately crisscrossed; and
    the laser is irradiated such that an irradiation area of the laser is smaller than an area of one weave of the fiber bundles.

* * * * *